United States Patent [19]

Moore et al.

[11] Patent Number: 5,005,291
[45] Date of Patent: Apr. 9, 1991

[54] LIVESTOCK DEHORNER

[76] Inventors: Wayland F. Moore, Box 665; Glynard Moore, Box 586, both of Matador, Tex. 79224

[21] Appl. No.: 439,773

[22] Filed: Nov. 21, 1989

[51] Int. Cl.⁵ .............................................. B26B 13/00
[52] U.S. Cl. ........................................ 30/244; 30/253
[58] Field of Search ...................... 30/244, 253, 243; 606/174

[56] References Cited

U.S. PATENT DOCUMENTS

| | | | |
|---|---|---|---|
| 441,065 | 11/1890 | Green | 30/244 |
| 444,611 | 3/1891 | Ingraham | 30/244 |
| 830,470 | 9/1906 | Webster | 30/244 |
| 1,994,864 | 10/1933 | Nisbet | 30/244 |
| 2,643,454 | 6/1953 | Kuhns | 30/253 |

Primary Examiner—Douglas D. Watts
Attorney, Agent, or Firm—Johnson & Gibbs

[57] ABSTRACT

Method and apparatus for removing horns from livestock. The apparatus comprises first and second generally U-shaped cutting blades pivotally secured to each other. At least one, and preferably both, of the cutting blades has a convexly curved leading edge. If desired, the convexly curved leading edges may also be bent inwardly towards the oppositely disposed blade to form an integral, convexly curved lip.

17 Claims, 2 Drawing Sheets

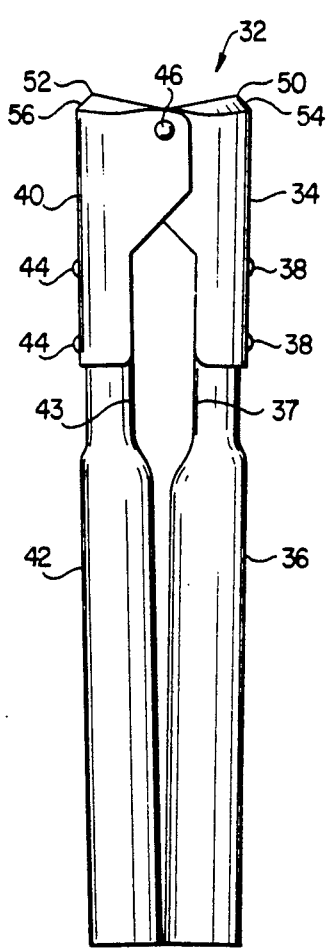
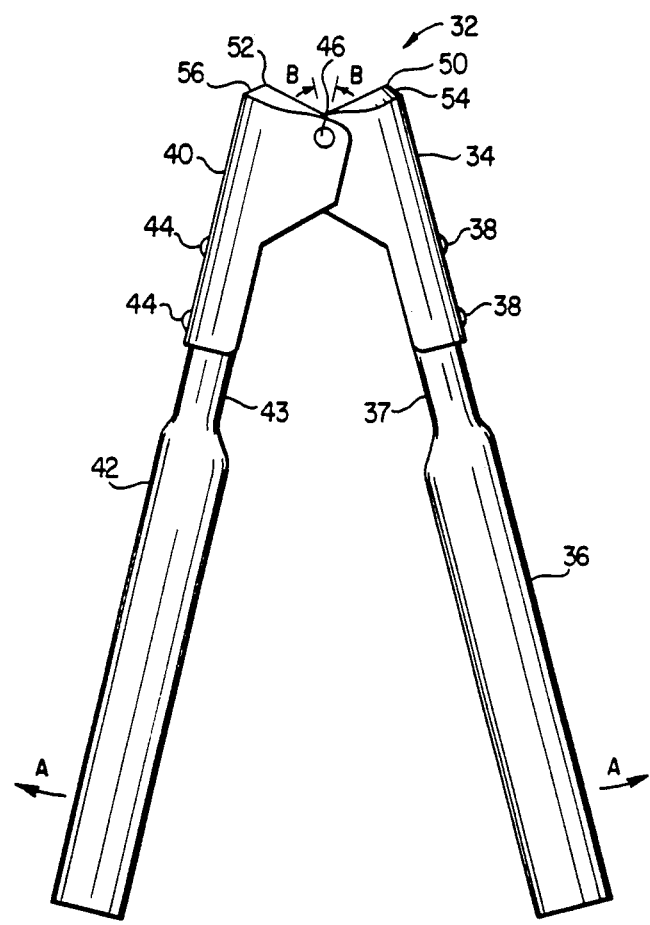
FIG. 3  FIG. 4
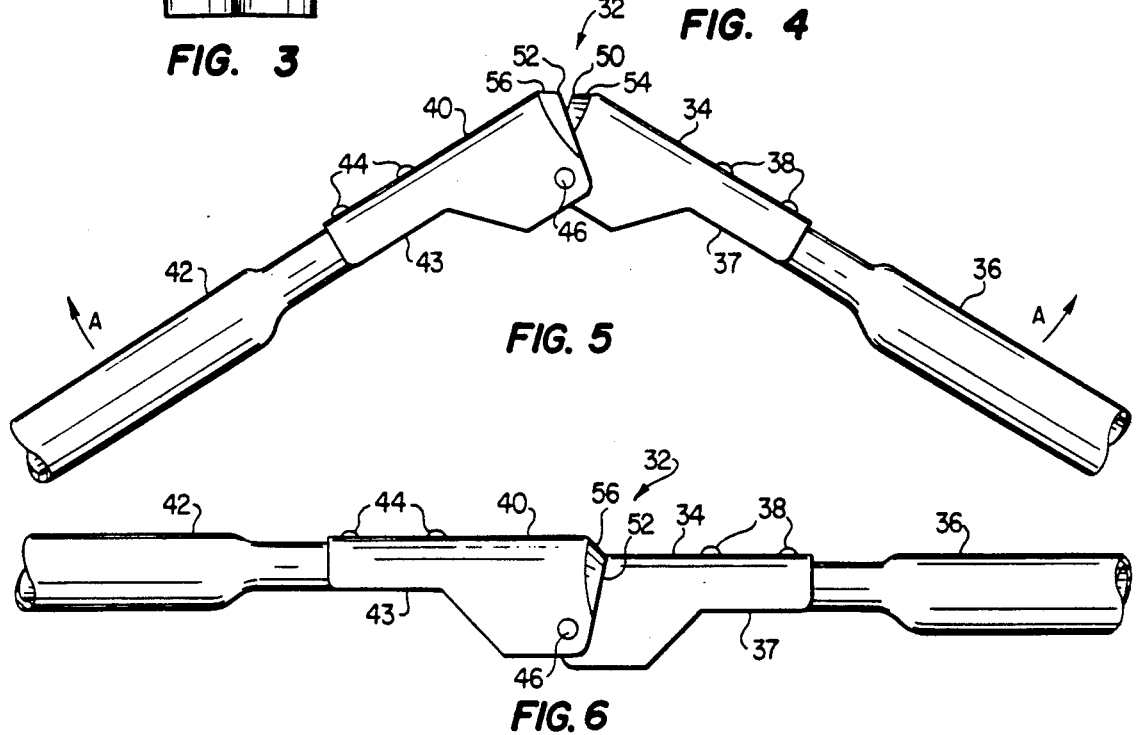
FIG. 5
FIG. 6

LIVESTOCK DEHORNER

BACKGROUND OF THE INVENTION

1. Field of the Invention

The present invention relates to apparatus for managing livestock, and more particularly, to a dehorner for livestock.

2. Description of Related Art

Certain mammals such as cattle, sheep, goats and antelope have hard protuberances extending from the frontal bone of their skulls. These hard protuberances, generally referred to as horns, consist of a bony core covered with a sheath of keratinous material. Depending on the particular breed, horns are used for varied purposes including defense of self and offspring, domination of others, clearing heavy undergrowth and others too numerous to mention.

Many horned animals such as cattle and sheep are utilized today for the production of foodstuffs such as meat and dairy products. To maximize foodstuff production, such animals are often kept in close quarters with other foodstuff producing animals. When animals are kept in such close quarters, the horn becomes inconsistent with the safe and efficient management of such horned animals for the aforementioned foodstuff production. Dehorning, which is defined as the literal removal of the horns from cattle or other horned livestock, is intended to reduce the possibility of injury to both the horned animals being kept as well as any stockmen or herdsmen managing such animals. When kept in close quarters, any horned animal can severely cut or bruise other animals in the herd. Such injuries reduce the value of the carcass for meat producing animals and reduce the rate of milk production for dairy producing animals. Furthermore, horned animals require more shed and feeding space, thereby reducing the efficiency of such operations. Finally, horned animals are harder and more dangerous to handle during routine management practices such as veterinary care.

There are numerous methods which may be utilized to dehorn livestock. One such technique is generally referred to as chemical dehorning. To chemically dehorn livestock, the hair is clipped or sheared from around the horn button and the surrounding area is ringed with a layer of heavy grease or vaseline. A caustic stick or paste consisting of a caustic potash such as potassium hydroxide or a caustic soda such as sodium hydroxide is then applied over the horn button. The chemical is rubbed over the button until blood appears. After applying the dehorning paste or stick, the animal is kept away from other animals for a few hours and out of the rain for 24 hours. One problem with chemical dehorning is the high risk of weight loss in the animal being dehorned. Typically, two weeks are required for the dehorned animal to regain its original weight. Also, the chemicals used in chemical dehorning may burn the animal's skin or eyes and may als cause scarring. Another disadvantage to chemical dehorning is that the use of chemicals make such techniques best suited for use with small herds which may be kept under constant supervision.

Another dehorning method is generally referred to as the "hot-iron method." Here, a specially designed iron, most often of a bell-shaped design, is utilized to burn the horn off an animal by directly applying a heated iron to the horn for a sufficient period of time. It is generally recommended that the hot-iron method should be used only when the horn button is less than three quarters of an inch in length. Thus, the hot-iron method may not be usable for all dehornings. Furthermore, the hot-iron method typically requires electricity not always available at the location where the animal is to be dehorned.

Another dehorning technique is generally referred to as the "dehorning spoon" or "dehorning tube" method. The dehorning spoon is a small instrument which is used to gouge out the horn buttons of an animal. The dehorning tube, on the other hand, fits over the base of the horn button as well as approximately one-half of an inch of the surrounding skin. The cutting edge of the dehorning tube is pushed and twisted each way until the skin has been cut through. The tube is then turned to about a 45 degree angle and the cutting edge rapidly twisted inward and downward so that the cutting edge of the tube cuts under the area of the horn button and spoons it out. Such techniques are best suited for very young animals having undeveloped horns and may not be recommended for most animals.

Another dehorning technique involves the use of an instrument known as an elastrator. The elastrator stretches a specially made rubber ring and, using the elastrator, the ring is placed down into the hair line of the animal. Smaller horns will drop off in 3 to 6 weeks while larger horns may take 2 months. Too often, however, such time delays are unacceptable.

The most common dehorning techniques involve the use of saw or clippers. To dehorn an animal using a saw or clippers, the animal is confined or unrestrained in a suitable chute, pinchgate, squeeze pen or cattle stock. The horn is then either sawed or clipped off. Various types of clipper dehorners are well known. U.S. Pat. No. 447,611 to Ingraham is directed to a tool for dehorning calves which includes a pointed, V-shaped blade. The handle of the tool is grasped and a blunt instrument struck against the opposite arm of the dehorner to force the cutting blades together, thereby cutting the horn.

Perhaps the most popular dehorner are the two handle clipper dehorners generally known as Barnes-type dehorners. For example, U.S. Pat. Nos. 441,065 to Green, 830,470 to Webster and 1,994,864 to Nisbet all discloses dehorners having a pair of pivoting cutting blades controlled by attached handles. To remove a horn, the horn is placed between the cutting blades and the handles pulled apart until the horn is clipped off. While each of the Green, Webster and Nisbet dehorners includes cutting blades of different shapes, each of disclosed cutting blades is formed having a straight leading edge.

Horned animals typically have horn cells which will produce regrowth of the horn after its removal. To properly dehorn an animal, these cells should also be removed during the dehorning process. However, the cells which produce regrowth of the horn are located around the outer edge of the horn, making their removal more difficult. As a result, it is desired to dig or penetrate the hide before reaching the base of the horn to ensure that the horn, after being removed, will not sprout regrowth. Thus, correct positioning of the dehorner is important to properly dehorn an animal. One problem in using such prior art dehorners having a cutting blade formed with a straight leading edge is the difficulty in properly positioning the cutting blades before removing the horn. Rather than quickly biting into the hide of the animal being dehorned, the cutting blades of such straight leading edge dehorners generally tend to slide when initially grasping the horn, thereby making the precise cutting of the horn difficult. To grasp the horn, a significant amount of pressure must be exerted. Also, by the time the cutting blades begin to firmly grasp the horn, the handles of such dehorner are well separated, thereby making it extremely difficult to adjust the position of the cutting blade after the blade has grasped the horn.

It is an object of this invention to provide a dehorner which quickly bites into the hide of the animal being dehorned, thereby providing a better grasp of the horn upon first contact.

It is another object of this invention to provide a dehorner which reduces the distance or length of dehorner handle separation required to firmly grasp the horn between its blades.

It is a feature of this invention to provide a dehorner having generally U-shaped blades with convexly curved leading edges.

It is another feature of this invention to provide a dehorner having generally U-shaped blades having integrally formed, convexly curved lips.

SUMMARY OF THE INVENTION

In one aspect, the invention comprises an apparatus for removing horns from an animal which includes a first cutting blade having a first, convexly curved leading edge and a second cutting blade having a second leading edge. The first and second cutting blades are pivotally secured to each other. A horn to be removed is positioned between the convexly curved leading edge of the first cutting blade and the second leading edge of the second cutting blade.

In another aspect, the invention comprises a livestock dehorner comprised of a first, generally U-shaped cutting blade having a convexly curved leading edge secured to a first elongated handle and a second, generally U-shaped cutting blade, also having a convexly curved leading edge, secured to a second elongated handle. At least one of the leading edges are bent inwardly to form a convexly curved lip. The first and second cutting blades are attached to each other by pivotal securing means. An opening is defined between the first and second cutting blades such that pivotal movement which separates the handles, closes the opening.

In yet another aspect of the invention, a method for dehorning an animal is provided. First and second blades, each having a convexly curved leading edge, are bent into general U shapes. The leading edge of at least one of the blades is then bent inwardly to form a convexly curved lip and the blades are pivotally secured together. A horn to be removed is placed within the opening defined by the leading edges of the blades. The horn is then secured between the blades by partially closing the opening until the convexly curved lip bites into the skin surrounding the horn. The opening is then quickly closed, thereby severing the horn and a small amount of surrounding skin between the blades.

BRIEF DESCRIPTION OF THE DRAWINGS

The present invention may be better understood, and its numerous objects, features and advantages will become apparent to those skilled in the art by reference to the accompanying drawings in which:

FIG. 1b is a side view of a flat blade which may be bent into a general U shape to form the blade of the dehorner illustrated in FIG. 1a;

FIG. 2b is a side view of a flat blade having a convexly curved leading edge which may be bent into a general U shape to form the blade of the dehorner illustrated in FIG. 2a;

FIG. 3 is a side view of the dehorner illustrated in FIG. 2a in a fully open position;

FIG. 4 is a second side view of the dehorner illustrated in FIG. 2a in a partially closed position; and FIG. 5 is a third side view of the dehorner illustrated in FIG. 2a in a almost completely closed position; and FIG. 6 is a fourth side view of the dehorner illustrated in FIG. 2a in a completely closed position.

DETAILED DESCRIPTION OF THE INVENTION

Figure 1A:
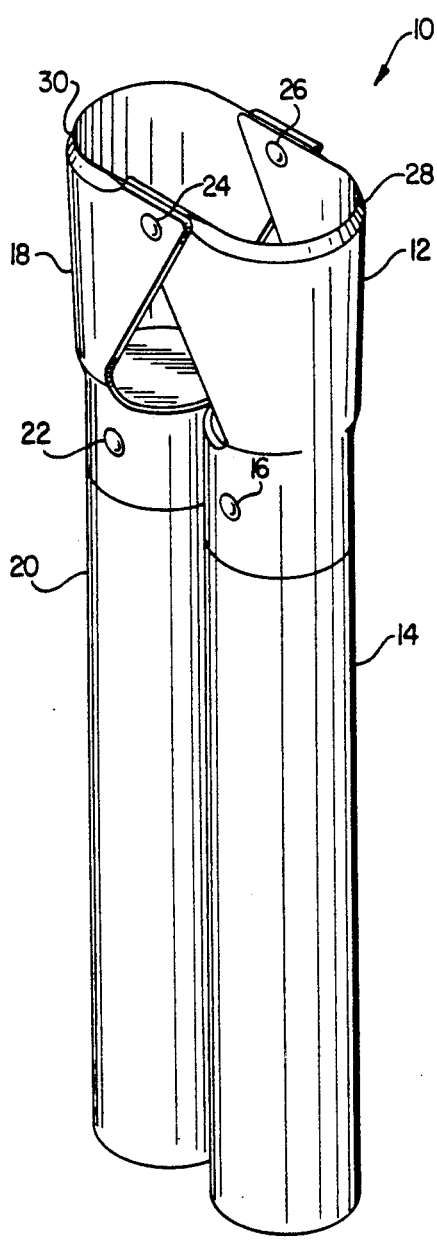
FIG. 1a is a perspective view of a prior art dehorner.

Referring first to FIG. 1a, a prior art dehorner of conventional design is illustrated. Dehorner 10 is comprised of a first, generally U-shaped cutting blade 12 secured to a first handle 14 by conventional securing means such as a screw 16 and a second, generally U-shaped cutting blade 18 secured to a second handle 20, again by conventional securing means such as a screw 22.

Figure 1B:
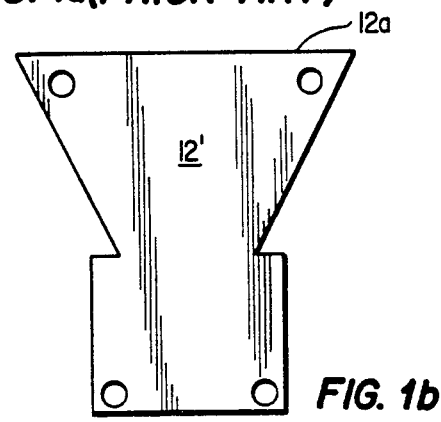

Referring now to FIG. 1b, each generally U-shaped cutting blade 12, 18 is formed from a flat blade 12' having a straight leading edge 12a. The flat blade 12' is then curved into a general U-shape having a radius approximately equal to the radius of the corresponding one of the handles 14, 20 to which the blades 12, 18 are to be attached.

Returning to FIG. 1a, the surface of the top portion of the cutting blade 12, 18 is then bevelled to form a bevelled portion 28, 30, thereby providing a cutting edge to be applied against a horn during dehorning. After securing each of the generally U-shaped cutting blade 12, 18 to the corresponding one of the handles 14, 20 as described above, the cutting blades 12, 18 are then pivotally secured to each other by conventional pivotal securing means such as rivets or brads 24, 26.

Figure 2A:
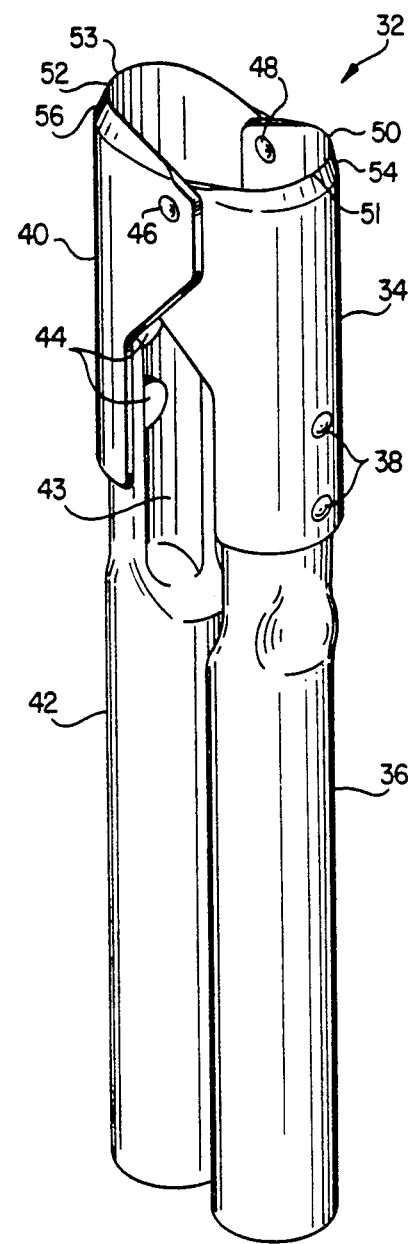
FIG. 2a is a perspective view of a dehorner constructed in accordance with the teachings of the present invention.

Referring next to FIG. 2a, a dehorner constructed in accordance with the teachings of the present invention may now be seen. The dehorner 32 comprises a first cutting blade 34 attached to a first handle 36 by conventional securing means 38 such as rivets and a second blade 40 secured to a second handle 42 by conventional securing means 44 such as rivets. Preferably, the handles 36, 42 should be constructed of pipes for added strength, and, even more preferably, the pipes should have depressed areas 37, 43 (not shown in FIG. 2a) for allowing the dehorner 32 to accept longer horns. After constructing the first cutting blade 34 and the second cutting blade 40 in accordance with the teachings set forth below, the first and second cutting blades 12, 18 are pivotally secured together by conventional pivotal securing means 46, 48 such as a pair of rivets.

As may be further seen in FIG. 2a, each cutting blade 34, 40 has a convexly curved leading edge 50, 52 which projects outwardly from the cutting blade 34, 40 until terminating in an outermost projection part 51, 53. During dehorning, the convexly curved leading edges 50, 52 are more quickly presented against the skin surrounding the base of the horn, thereby providing an improved initial grasp of the horn before severing. As may also be seen in FIG. 2a, a top portion 54, 56 of the cutting blades 34, 40 are turned inwardly by bending the top portions 54, 56 of the cutting blades 34, 40 towards the other cutting blades 40, 34, thereby forming the top portions 54, 56 into integral, convexly curved lips. In such a manner, the cutting blades 34, 40 are presented at a more effective cutting angle.

In the embodiment illustrated in FIG. 2a, the top portion 56 of the cutting blade 40 is bent inward to a noticeable degree while the cutting blade 34 is bent inward only slightly. In alternate embodiments of the invention, the top portion 56 may be turned inwardly as shown in FIGS. 3-5 and the top portion 54 may be kept unbent, or both top portions 54, 56 may be turned inwardly to an equal extent such as the extent top portion 56 is bent in FIGS. 3-5. The top portions 54, 56 may also be bevelled to provide sharper leading edges 50, 52.

Figure 2B:
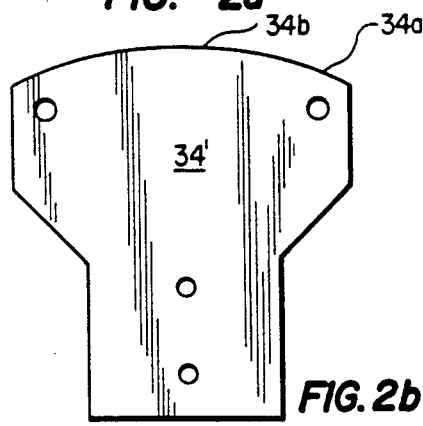

Referring next to FIG. 2b, the improved cutting blades 34, 40 of the present invention may now be more fully described. Each generally U-shaped cutting blade 34, 40 is formed from a flat blade 34' having a convexly curved leading edge 34a. The leading edge 50 increasingly projects outwardly away from the edges of the flat blade 34' until terminating in the outermost projection part 34b near the center line of the flat blade 34'. To form the cutting blades 34, 40, the flat blade 34' is bent into a general U-shape. After bending the cutting blades 34, 40 into a general U-shape, the top portions 54, 56 may be bent inwardly and bevelled, and the cutting blades 34, 40 mounted on the handles 36, 42 in accordance with the teachings set forth above.

Referring next to FIGS. 3-6, the operation of the dehorner 32 is now illustrated. FIG. 3 illustrates the dehorner 32 in an open position with the handles 34, 42 together. The convexly curved leading edges 50, 52 of the cutting blades 34, 40, respectively, are widely spaced such that the horn of an animal would easily fit therebetween. The dehorner 32 is then placed over a horn and down against the skull of the animal. Preferably, the dehorner 32 should be placed close enough to the animal's head that a ring of hair and skin one-quarter to one-half of an inch wide is removed with the horn. In FIG. 4, as handles 36, 42 are moved in direction "A", the convexly curved leading edges 50, 52 of the cutting blades 34, 40 move in direction "B", thereby approaching each other. As may be clearly seen, the convexly curved leading edges 50, 52 would more quickly bite into the hide and horn upon initial contact and with minimal separation of the handles 36, 42. In FIG. 5, the handles 36, 42 have been further separated by continued movement in direction "A". The leading edge 50 has begun to slide beneath the leading edge 52 to completely close the opening defined by the two. In this position, the horn would either be completely or nearly completely severed without the handles having to be fully extended. Finally, in FIG. 6, the handles 36, 42 have now been fully separated from each other, thereby completely closing the dehorner 34. In this position, the cutting blade 40 has passed completely the cutting blade 34. This ensures that, unlike prior Barnes-type dehorners, the horn and surrounding skin will be completely removed.

As can be seen from the above description of the present invention, there is provided a dehorner which provides both a better grasp of the skin surrounding the horn upon first contact of the blades against the base of the horn and which reduces the handle separation and arm pressure required to remove the horn by providing the dehorner with generally U-shaped blades, at least one of which has a convexly curved leading edge. However, those skilled in the art will recognize that many modifications and variations besides those specifically mentioned may be made in the techniques described herein without departing substantially from the concept of the present invention. Accordingly, it should be clearly understood that the form of the invention described herein is exemplary only and is not intended as a limitation on the scope of the invention.

What is claimed is:

1. An apparatus for removing horns comprising:
   a first cutting blade, said first cutting blade having a first, convexly curved, non-planar leading edge; and
   a second cutting blade having a second leading edge, said first and second cutting blades pivotally secured to each other;
   wherein a horn to be removed is received between said first, convexly curved, non-planar leading edge of said first cutting blade and said second leading edge of said second cutting blade.

2. An apparatus as set forth in claim 1 wherein said first cutting blade having said first, convexly curved, non-planar leading edge is bent inwardly toward said second cutting blade to form a first convex lip.

3. An apparatus as set forth in claim 1 wherein said second leading edge of said second cutting blade is a convexly curved non-planar leading edge.

4. An apparatus as set forth in claim 3 wherein said first cutting blade having said first, convexly curved, leading edge is bent inwardly toward said second cutting blade to form a first convex lip and said second, convexly curved, non-planar leading edge is bent inwardly toward said first cutting blade to form a second convex lip.

5. An apparatus as set forth in claim 4 further comprising:
   a first handle, said first cutting blade secured to said first handle; and
   a second handle, said second cutting blade secured to said second handle.

6. An apparatus as set forth in claim 5 wherein said first and second handles are made of pipe.

7. An apparatus as set forth in claim 6 wherein said first and second pipe handles are secured to said first and second cutting blades at a top portion of said pipe handles and wherein said first and second pipe handles are depressed inwardly towards said corresponding cutting blades to permit the accommodation of larger horns between said first and second cutting blades.

8. A livestock dehorner comprising:
   a first elongated handle;
   a first, generally U-shaped cutting blade secured to said first handle, said first cutting blade having a first convexly curved non-planar leading edge;
   a second elongated handle;
   a second generally U-shaped cutting blade secured to said second handle, said second cutting blade having a second convexly curved non-plural leading edge;
   means for pivotally securing said first cutting blade to said second cutting blade, said first and second cutting blades defining an opening therebetween such that pivotal movement which separates said handles closes said opening.

9. A livestock dehorner as set forth in claim 8 and further comprising a first convexly curved lip integrally formed with said cutting blade.

10. A livestock dehorner as set forth in claim 9 wherein said first convexly curved lip is formed by bending said first cutting blade inwardly.

11. A livestock dehorner as set forth in claim 9 further comprising a second convexly curved lip integrally formed with said second cutting blade.

12. A livestock dehorner as set forth in claim 11 wherein said second convexly curved lip is formed by bending said second cutting blade inwardly.

13. A method for dehorning a horned animal comprising the steps of:

providing first and second blade blanks, each said blade blank having a convexly curved leading edge;

bending each of said first and second blade blanks into a generally U-shaped cutting blade having a convexly curved non-planar leading edge; pivotally securing said first and second blades together;

placing said horn of said horned animal within an opening defined by said convexly curved leading edges of said first and second blades;

securing said horn between said blades by partially closing said openings such that said convexly curved leading edges of said first and second blades bite into skin surrounding said horn; and closing said opening, said first and second leading edges thereby cutting said horn off the animal.

14. The method according to claim 13 further comprising the step of bending said first generally U-shaped blade inwardly to form a convexly curved lip portion of said first blade.

15. The method according to claim 1 further comprising the step of bending said second generally U-shaped blade inwardly to form a convexly curved lip portion of said second blade.

16. The method according to claim 15 wherein said leading edges of said first and second blades are bent inwardly to different degrees.

17. The method according to claim 15 further comprising the steps of:

providing a first handle;

fixedly securing said first generally U-shaped blade to said first handle;

providing a second handle; and fixedly securing said second generally U-shaped blade to said second handle.

* * * * *